(No Model.)
R. H. PARKER.
AXLE LUBRICATOR.
No. 421,886. Patented Feb. 18, 1890.
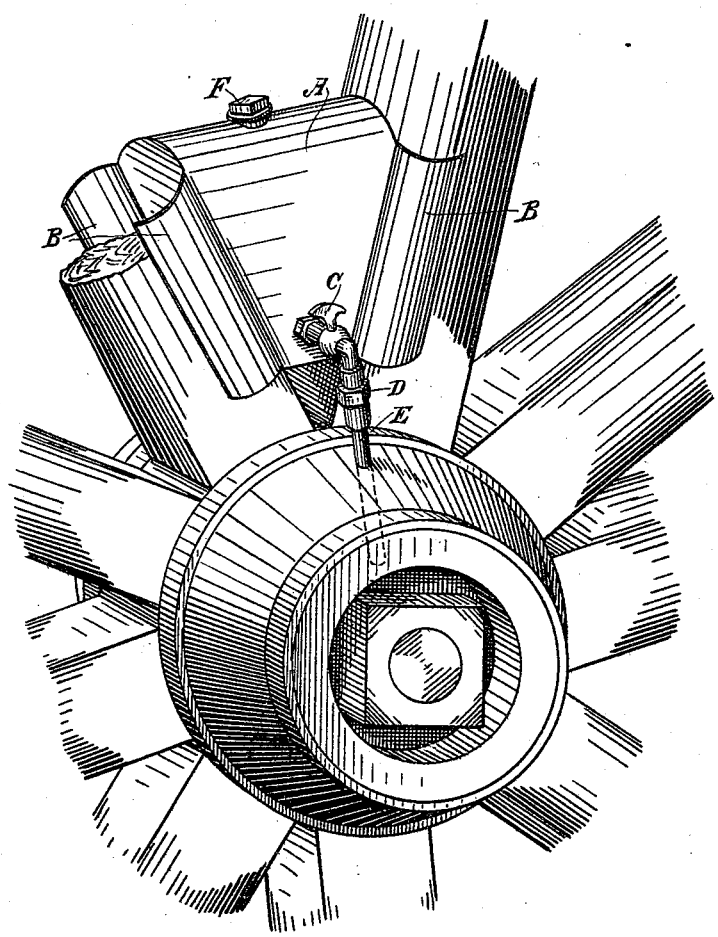
Witnesses,
Geo. H. Strong
Inventor,
Robert H. Parker
By Dewey & Co.
Attys

UNITED STATES PATENT OFFICE.

ROBERT H. PARKER, OF CARSON CITY, NEVADA.

AXLE-LUBRICATOR.

SPECIFICATION forming part of Letters Patent No. 421,886, dated February 18, 1890.

Application filed October 4, 1889. Serial No. 326,033. (No model.)

*To all whom it may concern:*

Be it known that I, ROBERT H. PARKER, a citizen of the United States, residing at Carson City, Ormsby county, State of Nevada, have invented an Improvement in Wagon-Hub Lubricators; and I hereby declare the following to be a full, clear, and exact description of the same.

My invention relates to a device for lubricating the axles of wagons, and it is especially adapted for use upon heavy freight-wagons where it is difficult to remove the wheels for this purpose.

It consists of a V-shaped tank fitted into the space between two of the spokes and against the periphery of the hub, and in connection therewith of a pipe and stop-cock, and a connection between the same and the interior of the axle-box.

Referring to the accompanying drawing for a more complete explanation of my invention, the figure is a view showing my apparatus in position upon a wagon-wheel.

A is a tank or chamber for containing the lubricant, and it is made wedge-shaped, as shown, and provided with projecting flanges B, of such form as to partially encircle two adjacent spokes of the wagon upon each side of the tank. This tank is so narrow at the bottom that its lower edge will rest upon the periphery of the hub. At one side of the tank is made an opening, and in it is screwed a stop cock or faucet C, and the discharge end of the faucet is provided with a screw-coupling D, by which it may be united to the pipe E. This pipe is permanently fixed in the hub of the wagon, passing through the side of the axle-box, so as to discharge within the axle-box, and the joint is made sufficiently tight to prevent the oil from escaping so as to soak the hub, if the latter be made of wood, and thus loosen the spokes. The connection between the faucet and this pipe, in addition to the clamping-plates B, will be sufficient to hold the chamber in place without any further fastening; but if desired other fastenings may be employed to connect it with the spokes.

Oil is introduced into the chamber through an opening at the top, which is closed by a screw-plug F, made sufficiently tight to prevent the oil from escaping from the chamber. A sufficient quantity of the lubricant can be placed in this chamber to last for a long while, and whenever it is desired to lubricate the axle of the vehicle the stop-cock may be turned at a time when the containing-chamber is upon the top of the hub of the wagon (the latter being stopped at such a point as will leave it in this position) until a sufficient quantity of oil or lubricant has been delivered into the axle-box, after which the stop-cock may be closed and the wagon allowed to go on.

If necessary to remove the oil-chamber, it is done by simply disconnecting the coupling D between the faucet and the pipe which leads through the hub.

Having thus described my invention, what I claim as new, and desire to secure by Letters Patent, is—

In a wagon-axle lubricator, an oil-reservoir shaped to fit between adjacent wheel-spokes and having extensions which clasp said spokes, and a discharge-pipe and stop-cock at one side, in combination with a pipe passing through the hub and axle-box at one side of the reservoir, and a screw-coupling by which connection may be made between the pipe and reservoir and the latter secured in place without other fastening, substantially as herein described.

In witness whereof I have hereunto set my hand.

ROBERT H. PARKER.

Witnesses:
GEO. H. STRONG,
S. H. NOURSE.